United States Patent [19]

Shaw

[11] Patent Number: 4,916,762
[45] Date of Patent: Apr. 17, 1990

[54] POSITIVE SHUT-OFF, METERED WATER CONTROL SYSTEM FOR FLUSH TANKS

[76] Inventor: William S. Shaw, 7606 Silvercrest Cir., Austin, Tex. 78757

[21] Appl. No.: 298,029

[22] Filed: Jan. 18, 1989

[51] Int. Cl.⁴ ............................................... E03D 1/36
[52] U.S. Cl. .......................................... 4/366; 4/415; 222/16; 222/20; 251/230
[58] Field of Search ............................ 4/366, 415, 353; 222/16, 14, 20, 59, 71, 72; 251/15, 230, 251, 249.5; 137/386

[56] References Cited

U.S. PATENT DOCUMENTS

| | | |
|---|---|---|
| 1,145,791 | 6/1915 | Pigott . |
| 1,407,752 | 2/1922 | Johns . |
| 1,552,261 | 8/1925 | Belcher . |
| 1,809,440 | 6/1931 | Elder . |
| 3,902,201 | 9/1975 | Bobo ..................................... 4/366 |
| 4,280,530 | 7/1981 | Yi . |
| 4,335,852 | 6/1982 | Chow . |
| 4,624,444 | 11/1986 | Johnson . |
| 4,633,905 | 1/1987 | Wang . |
| 4,708,264 | 11/1987 | Brunninga . |

*Primary Examiner*—Linda J. Sholl
*Attorney, Agent, or Firm*—Robert A. Miller

[57] ABSTRACT

A device for metering the flow of water into the tank and bowl of a toilet and providing a positive shut-off of the flow. When the toilet handle is turned, a linkage rotates a cam to force the stopper from its seat thereby commencing water flow. Water flows through a flow channel and past a water wheel imparting a rotation thereto. The water wheel is gearably connected to the cam thereby rotating the cam. When the cam has rotated to position a notch over the stopper stem, the stopper is reseated by the pressure of the water and water flow ceases. The amount of water flow permitted is a function of the number of cam notches and flow nozzle size.

18 Claims, 5 Drawing Sheets

POSITIVE SHUT-OFF, METERED WATER CONTROL SYSTEM FOR FLUSH TANKS

BACKGROUND OF THE INVENTION

The present invention relates to a positive shut off to the flow of water into the tank of a toilet (water closet) of the kind normally found throughout the world.

Toilet systems, as used in the American home, have been connected to the potable water supply. The average American home has from one to three of these toilets, each of which uses approximately 3.5 gallons, or more, of water per flush. The majority of these toilets operate by means of a flotation device attached to a water flow valve. When the toilet is flushed, a chain connected to the flush handle lifts a stopper opening an outlet in the bottom of the toilet tank. The water from the tank flows into the toilet bowl raising the level of water therein. When the water in the toilet bowl exceeds the height of the bowl drain, water begins to flow from the bowl by a siphoning effect which suctions out all water and waste in the toilet bowl. During this period of time, the flotation device, floating on the water in the tank, drops as the tank water level drops thereby opening a water inlet valve. When all water has exited the tank, the stopper falls closing the open outlet. The water now entering the tank, through the inlet valve, fills the tank. As the water level rises the float rises until the water valve is closed.

This system is effective, simple and relatively efficient. However, it can also be extremely wasteful. Should the stopper that closes the tank outlet wear, or become distorted, a leak occurs that allows water to constantly flow into the toilet bowl. Should enough water escape the tank, the float drops opening the water inlet valve to replace the lost tank water. Conversely, the inlet valve is subject to distortion and/or the buildup of minerals, particularly in hard water areas, that interfere with its efficient operation to the point where it will never completely close. The same result may occur from improper adjustment of the flotation device. In these latter cases, there is a constant flow, however small, of water into the tank. To preclude flooding, an overflow tube in the tank exits the excess water into the toilet bowl. Thus, the level of water in the tank never exceeds the height of the overflow tube, given the current designs, as the amount of water that may be introduced into the tank at any given time is less than the amount of water that the overflow tube permits to escape. However, this continual flow also leads to a waste of water.

Potable water, or fresh water, and its availability is becoming a significant environmental concern. Changing weather patterns, increased agricultural needs, the cutting of woods and forests, and the increasing destruction of water sheds have reduced the quantity of fresh water available. These factors, combined with population growth, have created severe strains on the ability of both nature and man to supply the necessary potable water. It is not uncommon to hear about local water rationing during peak water use periods. The problem has become so severe in some areas that legislatures, such as Massachusetts and California, have now legislated the use of toilets using less than the standard 3.5 gallons of water.

This problem has been addressed, principally in the context of public toilets, that is, toilets in public facilities that normally do not have toilet tanks but rather have metered flush valves or other mechanical or electrical shut-off devices in the water line.

However, a fluid operated valve for use with a toilet tank was disclosed in U.S. Pat. No. 1,145,791 issued to L. F. Pigott on July 6, 1915. The patent disclosed a tank inlet valve assembly comprising an impeller screw seated in an inlet housing. The impeller is connected by a shaft to a screw, intermeshing with the screw is a second screw which is connected by a rod to a valve. The valve closes an outlet port. Attached to the second screw, at the side opposite the valve, is a spring that is under tension when the valve is closed. The valve is activated by pulling a flush handle. The flush handle rotates an arm that supports the rod having the valve on one end and the screw with spring assembly on the other. This rotation disengages the two screws allowing the spring to retract, pulling the second screw, rod and valve assembly rearwardly to open the outlet port. When the flush handle is released, the rod is pulled back into position by a spring, remeshing the first and second screws. As the valve is opened, fluid exits through the outlet port thereby allowing water to enter through the inlet port, turning the impeller which in turn drives the first screw, now intermeshed with the second screw, until the valve is closed.

U.S. Pat. Nos. 1,552,261; 1,809,440 and 4,624,444, of Belcher, Elder and Johnson respectively, disclose metered flush valves that eliminate the need for a tank and are normally found in public facilities. The patent of Belcher, No. 1,552,261, discloses a metering device consisting of a valve that opens into the water flow and is closed by a combination of a spring pressure and water pressure. When the flush handle is turned, a mechanical linkage forces the valve open and locks it open by means of a ratchet. Water then flows through an impeller that is linked by a series of gears to a bar mechanism that is raised by the rotating impeller. The bar strikes the retaining ratchet tooth disengaging it and allowing the valve to close.

U.S. Pat. No. 1,809,440, of Elder, also discloses a valve for controlling the flow of water by turning off the water after a predetermined time or a given amount of water has passed. When the flush handle is rotated, paired inlet valves are opened to permit the water to flow. The flowing water strikes a turbine wheel. The turbine wheel is connected by a series of gears to a spiral gear that moves an arm to cause the rotation of the valves to a closed position. The patent of Johnson No. 4,624,444, is representative of shutoffs for flush toilets used in commercial establishments having pressurized lines.

Water control meters are also known for use in controlling watering devices. U.S. Pat. Nos. 4,280,530, of Yi, and 4,708,264, of Brunninga, are devices of this type. The device of Yi is placed in the water line for dispensing water to sprinklers or agricultural irrigation systems. Water enters through an inlet into an impeller chamber. The speed of rotation of the impeller is controlled by speed adjusting means which is essentially a frictional contact. The water flows from the impeller chamber into a second chamber containing the outlet valve. The outlet valve is set on one of three preset positions. Thus, the flowing water causes the impeller to rotate and an attached pinion gear initiates a gear train that terminates in a crescent gear. The crescent gear acts as a timing gear linked to the outlet valve and as it rotates, it slowly closes the valve to stop the flow of water. Pat. No. 4,708,264, the device of Brunninga, also discloses a timed water meter for a hose or sprinkling system. The outlet valve is set to a predetermined open position and water flowing through the system rotates an impeller which is linked through a series of planetary gears to rotate the valve control assembly. The valve control assembly rotates until released, at which time it permits the valve to be closed.

An electronic water controller is disclosed in U.S. Pat. No. 4,633,905 of Wang. As water flows over a water wheel, magnetic sensors within the wheel cross a relay thereby inputting the flow rate into a microprocessor. On the basis of the flow rate and the amount of water to be dispensed, the microprocessor computes the time that the outlet valve should be open. The outlet valve is opened by rotating a cam which in turn raises a post attached to the outlet valve. The outlet valve remains open until the calculated flow time has been achieved at which time the motor rotates the cam to a point where the post is allowed to fall and the valve closed. The valve itself is forced into a closed position by a spring.

Another device for measuring a precise amount of water is that of Johns, U.S. Pat. No. 1,407,752. This is an in line measuring device that uses a combination of gearing and pressure differential associated with a piston to control the flow of water.

U.S. Pat. No. 4,335,852, of Chow, discloses another device for controlling the flow of fluid. The device consists of a flow inlet having a valve placed therein. The valve has an associated stem that is positioned to ride on a cam. The device is pre-set for a given amount of flow. When the water flow is initiated it flows by an impeller which is connected by means of intermeshing gears to an eccentric shaft that drives a pawl and rachet, the rachet being attached to the cam. The rachet rotates the cam until such time as the stem can be pushed back into the stem notch. In addition to relying on water pressure to close the valve, a spring is placed between the ferrule cup, in the inlet, and a stud in the center of the valve assembly. The sealing means is an O-ring, around the valve, that is slightly larger than the opening for the inlet valve.

SUMMARY OF THE INVENTION

According to the instant invention a toilet flushing system is provided to precisely control the amount of water used by a toilet, or water closet, during each flush cycle and prevent further entry of water into the tank after the flush cycle has been completed. The positive shut-off, metered water control system comprises a stopper fitted to interrupt and shut off the flow of water from the source into the tank, a channel leading from the inlet, in which the stopper is positioned, to a vaned water wheel assembly and thence to an outlet tube such that, during water flow, the water wheel is caused to rotate. A worm gear, attached to the water wheel and rotating therewith, drivingly engages a spur gear that is part of a vertical intermediate gear assembly having a second worm gear on the lower end thereof. The worm gear of the intermediate gear assembly engages a spur gear of a ratchet gear assembly which is seated in a ratchet and cam assembly. The ratchet/cam assembly controls the positioning of the stopper in either an open or a closed position.

When the toilet handle is turned, an actuating arm engages a ratchet, mounted on the ratchet/cam assembly, to rotate the cam approximately one-eighth of a complete rotation, without rotating the gears. During this rotation, the cam forces the stopper stem, which had been seated in a notch in the cam, in a downward direction thereby opening the inlet valve. Water flows around the stopper, through the inlet valve, up the channel and past the water wheel causing it to rotate. As the water wheel rotates, the intermeshing gears translate the rotary motion of the water wheel into a rotation of the cam. Upon a complete rotation of the cam, the notch again aligns with the stopper stem and pressure of the water entering the tank pushes the stopper upward, thus closing the inlet valve. Upon closing of the inlet valve, the flow of water ceases with the water pressure keeping the inlet closed.

BRIEF DESCRIPTION OF THE DRAWINGS

The present invention will be better understood from the following detailed description of the invention taken in conjunction with the accompanying drawings in which like reference numerals refer to like parts and in which.

DESCRIPTION OF THE PREFERRED EMBODIMENTS

Figure 1:
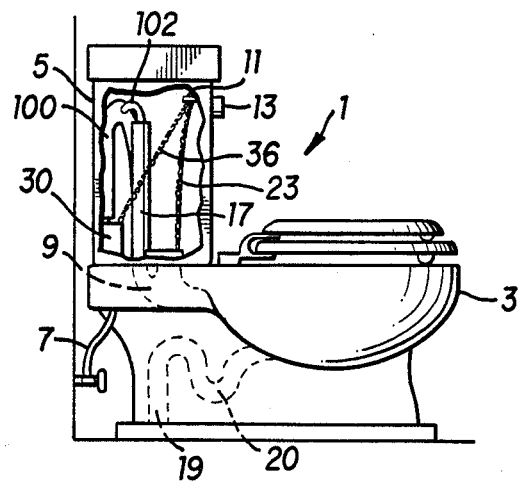
FIG. 1 is a plan side view of a type conventional toilet, with the tank partially cut away to reveal its interior, incorporating the positive shut-off, metered water control system.
Figure 2:
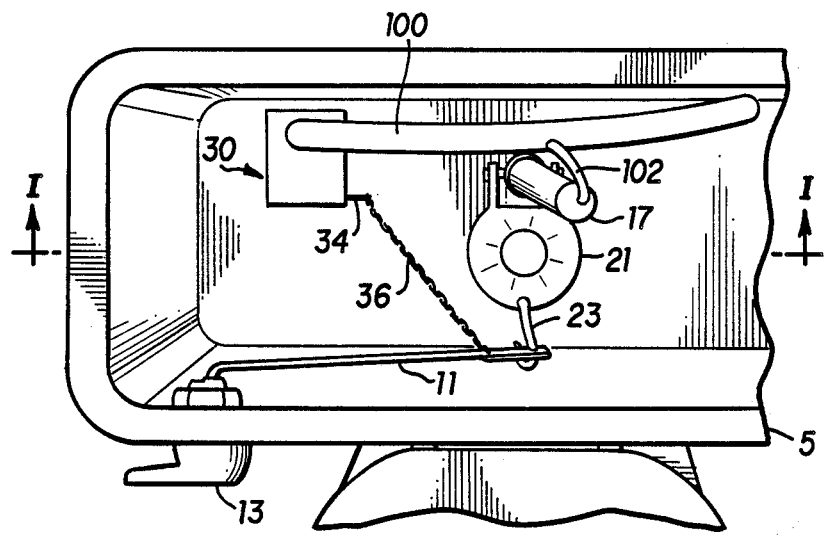
FIG. 2 is a top plan view of the principal portion of the toilet tank of FIG. 1 with the lid removed.
Figure 3:
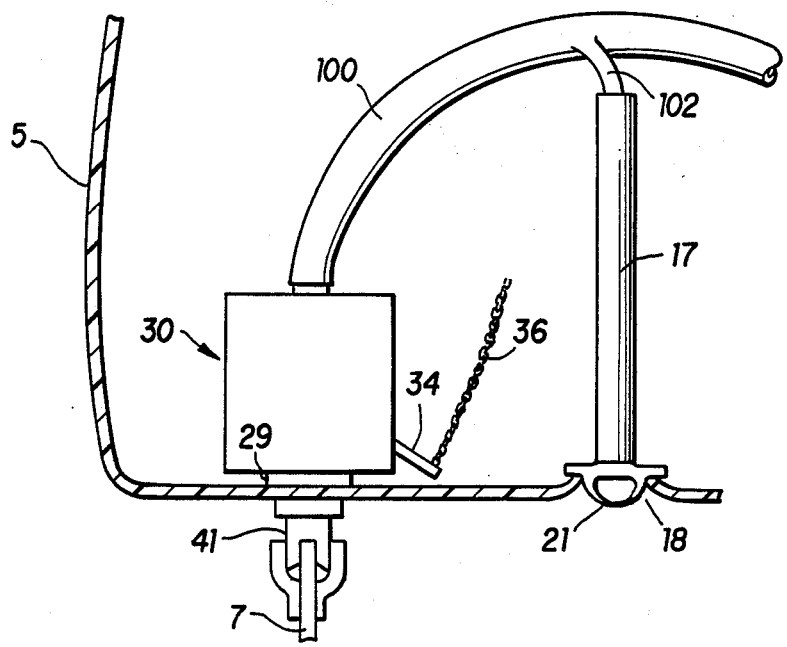
FIG. 3 is a view along line I—I of FIG. 2.
Figure 4:
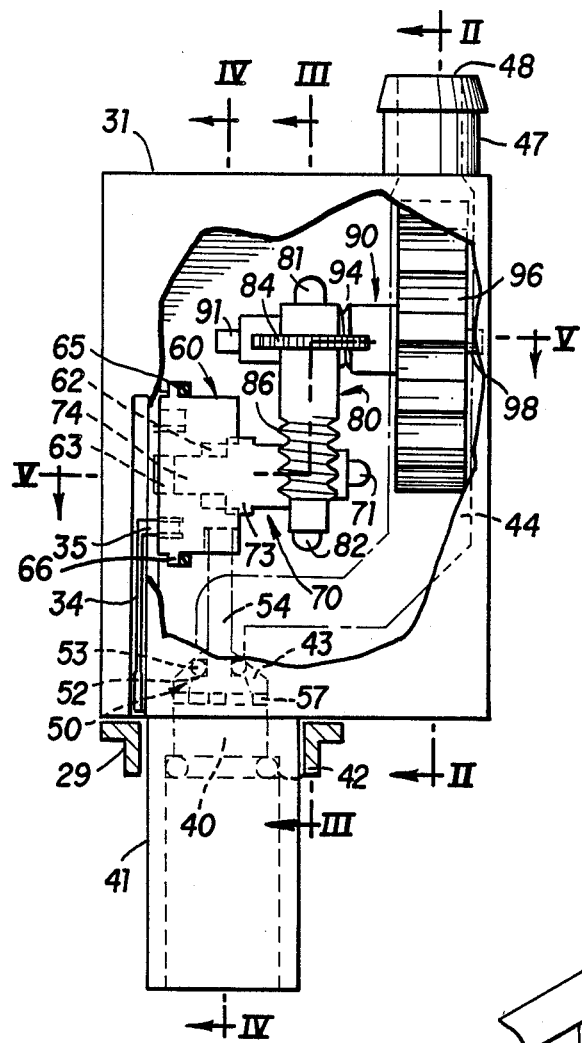
FIG. 4 is a cut away side view of the water control assembly.
Figure 5:
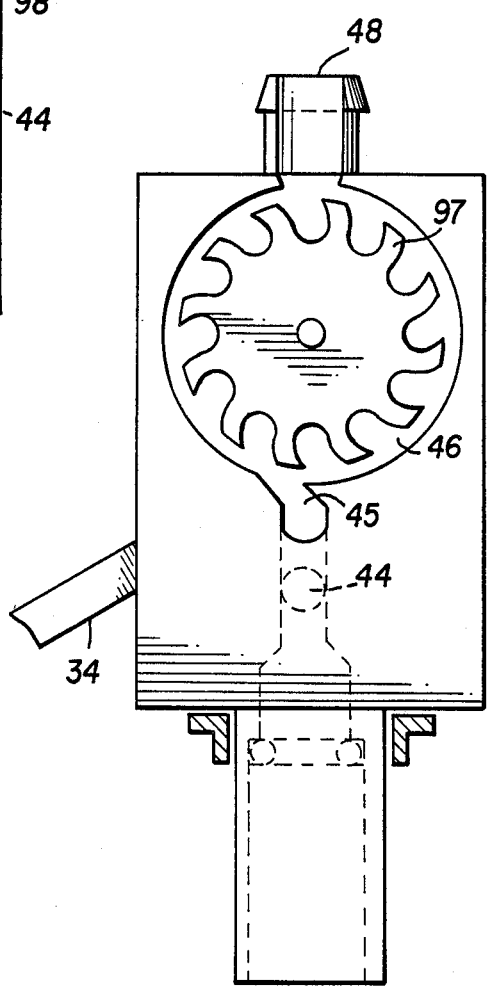
FIG. 5 is a view of the water control assembly along line II—II of FIG. 4.

FIG. 1 shows a type conventional toilet as found in the home. The toilet consists of a toilet bowl and pedestal 3 with a tank 5 mounted, either as part of or removeably, over the rear extension of the toilet bowl and pedestal 3. Water is introduced by means of water line 7, which is connected by known means to inlet fitting 41 of water control assembly 30. The water escapes, or is allowed to exit tank 5, by means of an overflow tube 17 or through tank outlet 18, normally closed by flapper valve 21. When water from overflow tube 17 or tank outlet 18, enters the toilet bowl, it raises the level of water therein until the level exceeds the "S" shaped trap of waste outlet 19 causing the water to flow from toilet bowl 3 by a siphoning action. Water, and waste products, will continue to exit toilet bowl 3 as long as sufficient water enters toilet bowl 3 through bowl inlet 9 to maintain the seal permitting vacuum pumping or siphoning action of the bowl contents.

Handle 13 is connected to lever arm 11. Attached to lever arm 11 are flapper valve link 23 and start arm link 36. When handle 13 is turned counterclockwise, or in a downward direction, lever arm 11 is raised to lift, through linkages 23 and 36, flapper valve 21 and start arm 34 respectively.

In the conventional home toilet, a ball cock assembly comprising a float arm and ball is mounted at the upper end of a water tube for closing an inlet valve via a mechanical linkage when the tank is filled to a predetermined level. In the present invention this assembly, to include the inlet valve and float arm and ball, is removed and replaced with a positive shut-off, metered water control system, which may be placed above or below the water line of a filled tank. However, the ball cock assembly could be retained by mounting it to outlet tube 47 of the water control assembly 30, where control assembly 30 is mounted at the tank inlet, should water shut-off redundancy be desired. FIGS. 4-8 illustrate a positive shut-off, metered water control system according to the preferred embodiment of the present invention. Although the preferred embodiment is intended to permit the entry of three and a half gallons of water into the toilet system, modifications will be noted in the description that may be made to the assembly to provide a range of permissible flows between one-half and six gallons of water. Housing 31 for water control assembly 30 is preferably molded in at least two sections of a plastic compound that may be sealed by means of sonic welding. Sealing of the housing is necessary to meet the plumbing requirements for "anti-siphoning" when the control assembly is mounted below the tank water line. Attached at the bottom, center-rear of housing 31 is inlet fitting 41. This is a standard size fitting used with flush tanks to provide a sealable mounting 29 at the bottom of the tank and for attachment of water line 7 by known means. The inside annular dimension of inlet fitting 40 is slightly smaller at the top than at the bottom and matches the opening into housing 31. Positioned at the point of constriction in inlet fitting 41 is retention ring 42. Retention ring 42 prevents stopper 50 from disingaging from housing 31 should water pressure be lost in water line 7. Inlet 40 further narrows in the lower portion of housing 31 to become flow channel 44. Flow channel 44 directs the flow of water from inlet opening 43 to chamber 46, which it enters at an obtuse angle. Outlet 48, atop chamber 46, permits the water to escape from the housing. Mounted, by means of bushings 91 and 98, in recesses 92 and 99 in housing 31, is water wheel assembly 90. Water wheel 96, part of water wheel assembly 90, is centered and freely rotatable within chamber 46. Extending from water wheel 96, along the longitudinal axis of rotation, is the remainder of water wheel assembly 90 having centered therein worm gear 94. Mounted transverse to the longitudinal axis of rotation of the water wheel assembly 90 is intermediate gear 80. Intermediate gear 80 is rotatably mounted within housing 31 by means of mounting ears 81 and 82, which are seated in recesses in housing 31. At the upper end of intermediate gear 80 is spur gear 84. Spur gear 84 is intermeshably connected with worm gear 94 of wheel assembly 90. At the lower end of intermediate gear 80 is worm gear 86.

Extending transverse to intermediate gear 80 and lying directly below and parallel to the longitudinal axis of rotation of water wheel assembly 90 is ratchet gear 70. Ratchet gear 70 is mounted in housing 31 by means of mounting ear 71 and rib gear 73 which is slidably received in ratchet gear housing 62 of ratchet/cam assembly 60. Ratchet gear stub 74 is slidably received in stub receptacle 63 in ratchet/cam assembly 60 so that ratchet/cam assembly 60 rotates with ratchet gear 70. Attached to ratchet gear 70 is spur gear 72 that intermeshes with worm gear 86 of intermediate gear 80. Ratchet/cam assembly 60 is rotatably mounted in housing 31 such that its outer surface containing ratchet teeth 61 may be engaged by pawl 35 of start arm 34. Pawl 35 is seated between ratchet teeth 61 and retention ring 69. Seal 65 between cam assembly lip 66 and housing 31, prevents tank water from entering into the interior of housing 31.

Attached to outlet tube 47 is main tube 100. Main tube 100 is arched such that the highest point of the arch is above the water line of tank 5 when full and the outlet of main tube 100 is at the bottom of tank 5. Attached to main tube 100 at its highest point is fill tube 102, a small tube that feeds into overflow tube 17.

Figure 7:
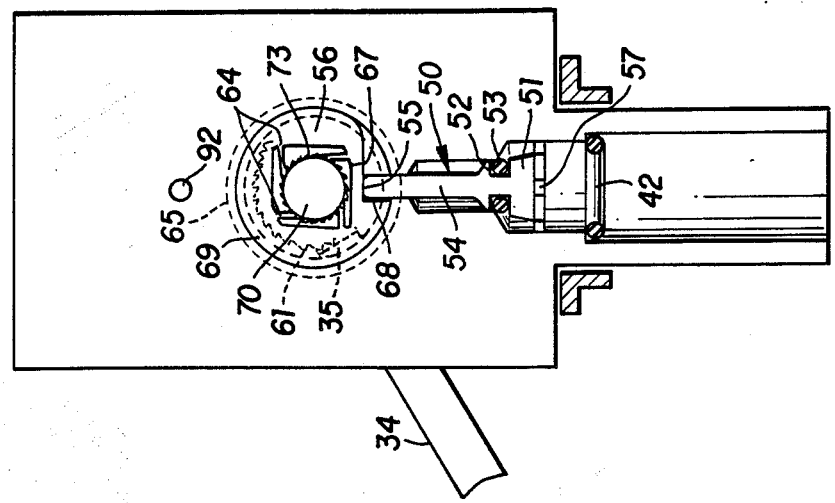
FIG. 7 is a view along line IV—IV of FIG. 4.
Figure 6:
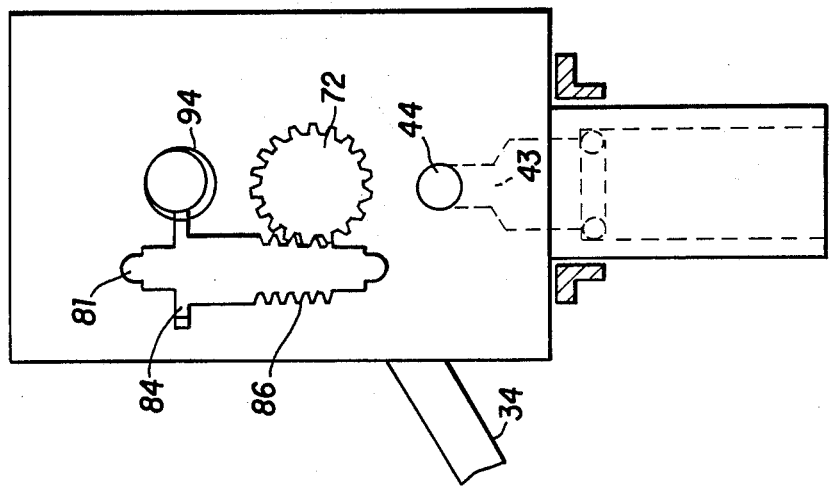
FIG. 6 is a view along line III—III of FIG. 4.
Figure 8:
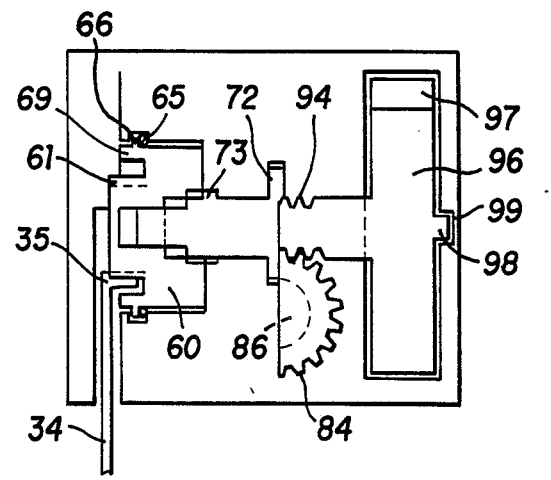
FIG. 8 is a view along line V—V as indicated in FIG. 4.

Seated within inlet 40 of housing 31 is stopper 50. Stopper base 51 is of slightly smaller cross-section than is the opening of inlet 40. Attached to the bottom of stopper base 51 are four positioning arms 57, each arm offset at a 90° angle from adjacent arms for centrally positioning stopper 50 in inlet 40. In the upper portion of stopper base 51 is notch 52 for holding O-ring seal 53. Stopper stem 54 extends upwardly, from stopper base 51, in flow channel 44 and thence through an opening in housing 31 to engage cam 56. Cam 56, in the standard three and a half gallon water tank, has one cam repeat 68. When stem top 55 of stopper 50 is seated against notch surface 67 of cam 56 as shown in FIG. 7, there is no flow of water into the tank.

To operate the system, handle 13 is depressed to lift lever arm 11. Lever arm 11, by means of flapper valve link 23, lifts flapper valve 21 to open tank outlet 18. Water flows from tank 5 until such time as the water level drops below the underside of flapper valve 21. At that point, flapper valve 21 falls, closing tank outlet 18 and tank 5 begins to refill. Simultaneous with the lifting of flapper valve 21, lever arm 11, through start arm link 36, lifts start arm 34. Pawl 35, of start arm 34, engages a tooth 61 of the ratchet that is an integral part of ratchet/cam assembly 60. Pawl 35 remains engaged, during the depression of handle 13, to tooth 61 to turn ratchet/cam assembly 60 through approximately one eighth of a complete rotation. The mating of ratchet gear 70 to ratchet/cam assembly 60, as shown in FIG. 7, permits ratchet/cam assembly 60 to rotate without rotating ratchet gear 70 and the remaining intermeshing gears during the initial one eighth rotation of ratchet/cam assembly 60. Ratchet gear 70 has rib gear 73 engagingly received in ratchet gear housing 62 by ribs 64 such that ribs 64 pass over the teeth of rib gear 73 during the rotation of ratchet/cam assembly 60, by pawl 35, and are engaged by the teeth of rib gear 73 once water begins to flow. As ratchet/cam assembly 60 rotates, notch surface 67 of cam repeat 68 is rotated across stem top 55 of stopper 50 forcing stopper 50 downwardly and breaking the seal between O-ring seal 53 and inlet opening 43 to permit water to flow into flow channel 44. Water, now flowing through flow channel 44, is deflected by flow nozzle 45 to strike vanes 97 of water wheel 96 to cause the rotation of water wheel 96, the water wheel rotation to cam rotation ratio being 784:1. The water flows around the outer surface of chamber 46 and out of outlet 48 into main tube 100. At the highest point of main tube 100, approximately one fourth of the water is diverted into bowl fill tube 102 and thence into overflow tube 17 to provide water fill to toilet bowl 3 and trap 20 of waste outlet 19. As water wheel 96 rotates in a clockwise direction so too does associated worm gear 94 which intermeshes with spur gear 84 of intermediate gear 80. The rotation of intermediate gear 80, via worm gear 86 and intermeshing spur gear 72 of ratchet gear 70, is transferred to ratchet/cam assembly 60 by means of the engagement of the teeth of rib gear 73 of ratchet gear 70 and ribs 64 of ratchet/cam assembly 60. Thus, cam 56, of ratchet/cam assembly 60, continues to rotate until cam repeat 68 again is positioned directly above stem top 55. At that point the pressure resulting from the flowing water striking the underside of stopper base 51 forces stopper 50 upward so that stem top 55 again rests proximate to or against notch surface 67 with the result that inlet opening 43 is sealed and water flow ceases.

In the embodiment disclosed, the gear ratio of 784:1 and the size of the opening of flow nozzle 45 combine to provide a water flow of three and a half gallons. By placing a second notch surface, offset 180° from notch surface 67 in ratchet/cam assembly 60, a flow control meter for one and three quarters gallons would be created. By adjusting the size of flow nozzle 45, either by using different housings with nozzles of different sizes or by inserting an adjustable nozzle into flow channel 44, lessor or greater amounts of flow are provided. Further, additional notch surfaces could be placed in cam 66 creating other metered flows in response to legislative requirements or toilet design considerations. Thus positive shut-off, metered water control systems for one-half to six gallons of water flow may be achieved using the inventive concept.

For ease in construction of the internal parts, that is, the stopper, water wheel assembly, intermediate gear, rachet gear and ratchet/cam assembly, they may be injection molded using appropriate compositions. The start arm would normally be made of stainless steel, for durability and would be the only metal part within the device.

Although some embodiments of the invention have been described above by way of example only, and preferred techniques of manufacture have been enumerated, it will be understood by those skilled in the art that modifications or other techniques may be made to the disclosed embodiment without departing from the scope of the invention which is defined by the appended claims.

What I claim to be secured by letters patent of the United States is:

1. A positive shut-off, metered water control system for flush toilet tanks comprising:
   a housing assembly, said housing assembly sealed so as to be capable of mounting below the water line in the toilet tank;
   an inlet fitting means attached to said housing assembly for mounting said control system in the flush tank and providing a connection to a source of water under pressure;
   an outlet on said housing assembly;
   means for directing the flow of water into the toilet tank removably attached to said outlet;
   stopper means mounted between said inlet fitting means and said outlet for movement between sealed and open positions for shutting off or permitting water flow;
   flow channel means within said housing assembly for directing the flow of water when said stopper means is in an open position;
   start means for placing said metered water control into operation;
   an impeller rotatably mounted in a cavity portion of said flow channel means in said housing assembly between said inlet fitting means and said outlet;
   cam means for controlling said positions of said stopper means, said cam means being linked to said start means;
   linkage means for transferring the rotation of said impeller into a rotation of said cam means; and
   disengagement means for permitting said cam means to be rotated by the linked said start means without imparting rotation to said linkage means and said impeller.

2. A positive shut-off, metered water control system as claimed in claim 1 wherein said start means further comprises:
   a handle;
   a flexible connection means attached at one end to said handle;
   a start arm, said start arm having an extended section and a pawl, attached at one end of said extended section is the end of said connection means opposite said end attached to said handle, said pawl extends transverse to said extended section opposite its attachment to said connection means to engage said cam means.

3. A positive shut-off, metered water control system as claimed in claim 1 wherein said housing assembly is molded from at least two sections of a plastic material that are joined and sealed by sonic welding.

4. A positive shut-off, metered water control system as claimed in claim 1 wherein said stopper means, impeller, cam means and linkage means are injection molded.

5. A positive shut-off, metered water control system as claimed in claim 2 wherein said linkage means further comprises:
   a first worm gear rigidly attached to said impeller, said worm gear lying along and centered on the axis of rotation of said impeller;
   an intermediate gear, said intermediate gear being transverse to said axis of rotation of said impeller and having a spur gear at its upper aspect and a second worm gear at its lower aspect, said spur gear rotatably meshed with said first worm gear; and
   a ratchet gear, said ratchet gear lying below and parallel to said axis of rotation of said impeller and having a spur gear on a forward aspect, said spur gear rotatably meshed with said second worm gear, and a rearward aspect mated by said disengagement means to said cam means.

6. A positive shut-off, metered water control system as claimed in claim 1 wherein said flow channel means contains a direction flow nozzle leading to said cavity portion of said flow channel means.

7. A positive shut-off, metered water control system as claimed in claim 6 wherein said direction flow nozzle has an adjustable opening.

8. A positive shut-off, metered water control system as claimed in claim 1 wherein said cam means comprises only one cam notch.

9. A positive shut-off, metered water control system as claimed in claim 1 wherein said cam means comprises at least two cam notches.

10. A positive shut-off, metered water control system as claimed in claim 1 wherein said stopper means is positively engaged to said cam means by water pressure.

11. A positive shut-off, metered water control system as claimed in claim 10 further comprising retention means for retaining said stopper means seated in said housing when water pressure is lost.

12. A positive shut-off, metered water control system as claimed in claim 1 further comprising means for dividing and directing the flow of water from said outlet into the toilet tank and the toilet's bowl.

13. A device for controlling the flow of water into a tank toilet, as found in the home, comprising:
a housing, said housing having an inlet and an outlet, defining a flow channel between said inlet and said outlet and capable of mounting below the water line of the tank toilet;
a stopper positioned in said inlet for sealing said inlet;
a start means for displacing said stopper and breaking said seal permitting water to flow;
a cylindrical chamber in said flow channel between said inlet and said outlet;
means rotatably mounted in said cylindrical chamber for transferring the pressurized flow of water into a mechanical rotation;
means for rotatably linking said rotatably mounted means and said start means;
anti-siphoning means for preventing water in the tank toilet from exiting through said inlet should water pressure be lost, said anti-siphoning means attached to said outlet;
means for disengaging said start means from said means for rotatably linking said means rotatably mounted in said cylindrical chamber during the displacement of said stopper; and
means for reseating said stopper to stop water flow.

14. A device for controlling the flow of water as claimed in claim 13 further comprising retention means for retaining said stopper in said inlet.

15. A device for controlling the flow of water as claimed in claim 13 wherein said anti-siphoning means distributes the flowing water between the toilet's tank and bowl.

16. A device for controlling water flow for use in toilet tanks comprising:
a housing, said housing mounted to the bottom of the toilet tank below the water line and having an inlet, an outlet and a flow channel therebetween;
a cylindrical chamber in said flow channel;
a water wheel assembly, said water wheel assembly having a water wheel rotatably mounted in said cylindrical chamber;
a gear centered on said water wheel's rotary axis and attached thereto;
a rotatably mounted start mechanism;
an initiation mechanism, said intiation mechanism engaging said start mechanism to initiate rotation of same;
a cam, said cam having at least one recessed portion, rigidly attached to said start mechanism;
a stopper, said stopper seated in said inlet and having a stem in contact with the surface of said cam;
a ratchet gear slidably received within said cam;
an intermediate gear linking said water wheel assembly and said ratchet gear; and
an anti-siphon assembly removably attached to said outlet, said anti-siphon assembly comprising means for distributing the water flow between the toilet's tank and bowl.

17. A device as claimed in claim 16 further comprising a flow control nozzle in said flow channel at the entrance to said cylindrical chamber.

18. A device as claimed in claim 17 wherein said flow control nozzle is adjustable.

* * * * *